US006779719B2

(12) United States Patent
Guindulain Vidondo

(10) Patent No.: US 6,779,719 B2
(45) Date of Patent: Aug. 24, 2004

(54) COMBINED SYSTEM OF AUTOMATIC SELLING OF PRODUCTS AND SERVICES

(75) Inventor: Félix Guindulain Vidondo, Peralta (ES)

(73) Assignee: Jofemar, S.A., Peralta (ES)

( * ) Notice: Subject to any disclaimer, the term of this patent is extended or adjusted under 35 U.S.C. 154(b) by 0 days.

(21) Appl. No.: 09/773,092

(22) Filed: Jan. 31, 2001

(65) Prior Publication Data

US 2001/0015376 A1 Aug. 23, 2001

(30) Foreign Application Priority Data

Feb. 22, 2000 (ES) .......................................... 200000412

(51) Int. Cl.$^7$ ................................................. G06F 7/08
(52) U.S. Cl. ......................... 235/381; 235/383; 705/16
(58) Field of Search ................................. 235/380, 381, 235/384, 383; 705/16, 400

(56) References Cited

U.S. PATENT DOCUMENTS

| 4,767,917 | A | * | 8/1988 | Ushikubo | 235/381 |
|---|---|---|---|---|---|
| 4,778,983 | A | * | 10/1988 | Ushikubo | 235/381 |
| 4,873,633 | A | * | 10/1989 | Mezei et al. | 356/39 |
| 5,445,295 | A | * | 8/1995 | Brown | 235/381 |
| 5,685,435 | A | * | 11/1997 | Picioccio et al. | 209/677 |
| 5,769,269 | A | * | 6/1998 | Peters | 221/7 |
| 5,822,216 | A | * | 10/1998 | Satchell et al. | 700/232 |
| 5,831,862 | A | * | 11/1998 | Hetrick et al. | 364/479.02 |
| 5,842,597 | A | * | 12/1998 | Kraus et al. | 221/150 R |
| 5,884,140 | A | * | 3/1999 | Ishizaki et al. | 455/2 |
| 5,896,975 | A | * | 4/1999 | Lee | 194/218 |
| 5,904,869 | A | * | 5/1999 | Saito et al. | 219/121.68 |
| 5,914,886 | A | * | 6/1999 | Lee | 364/479.02 |
| 5,959,869 | A | * | 9/1999 | Miller et al. | 364/479.01 |
| 5,997,236 | A | * | 12/1999 | Picioccio et al. | 414/403 |
| 6,062,277 | A | * | 5/2000 | Seo | 141/362 |
| 6,123,223 | A | * | 9/2000 | Warkins | 221/121 |
| 6,230,150 | B1 | * | 5/2001 | Walker et al. | 705/400 |
| 6,279,718 | B1 | * | 8/2001 | Nulph et al. | 194/206 |
| 6,401,009 | B1 | * | 6/2002 | Chandonnet | 700/231 |

FOREIGN PATENT DOCUMENTS

| JP | 57-31074 | * | 2/1982 | |
|---|---|---|---|---|
| JP | 60-7572 | * | 1/1985 | |
| WO | WO 97/10576 | | 3/1997 | G07F/7/00 |
| WO | WO 99/67752 | | 12/1999 | G07F/9/10 |

* cited by examiner

Primary Examiner—Michael G. Lee
Assistant Examiner—Uyen-Chau N. Le
(74) Attorney, Agent, or Firm—Klauber & Jackson

(57) ABSTRACT

Combined system of automatic selling of products and services, useful to be included in all types of automatic vending machines, that indludes th inclusion in an automatic machine (1), of module (21) that has service operating equipment, the machine (1) having the corresponding product selection pushbuttons (5) and a service selection push button (4). The services module (21) having a display (7) designating the method of payment for the service designated on display (3) fo the automatic machine when the service is selected, as well as the service operating buttons (12) and service rendering elements (14), the service control circuit (13) being controlled by the main control electronics (8) and connected to the telephone line (15).

6 Claims, 3 Drawing Sheets

COMBINED SYSTEM OF AUTOMATIC SELLING OF PRODUCTS AND SERVICES

OBJECT OF THE INVENTION

As expressed in the title of the present specification, the following invention refers to a combined system of automatic selling of products and services, which is based on the combination, in an automatic machine actuated by the insertion of coins, of the selling of products and the rendering of certain services, in such a way that an automatic machine, aside from the possibility of purchasing certain products such as cigarettes, beverages, etc. includes the rendering of a service, such as for example, a telephone service, connection to Internet, etc.

In this way, by means of a single machine a better and more complete service is given to the public, while the machine has common devices so that it operates like a vending machine and a service rendering machine, the final cost being lower for the one who manages the same.

Furthermore, if the vending and service rendering machine includes as a service the telephone service, the telephone connection may be used to transmit reports regarding the operation of the system to an operations center, as well as to receive instructions and operating parameters therefrom.

The system permits the simultaneous use of the rendering of the service and the selling of products, in such a way that while a user uses one of the possible services, such as for example talking on the phone, a second user may purchase an independent product at the same time.

In short, it is a new concept that permits the combination in a vending machine of the selling of products with the rendering of services, something which has been done up until now by independent means, namely, in another machine or apparatus.

FIELD OF USE

The system of automatic selling of products and services that is presented is useful in order to be included in automatic vending machines, being especially useful for the inclusion of the telephone service and all the added advantages thereof, in cigarette and hot and cold beverage vending machines.

BACKGROUND OF THE INVENTION

As it is known, more and more there is a larger number of automatic vending machines at the service of the public in general, vending machines that in turn have a larger number of products to be dispensed, and likewise, there is a larger number of machines or apparatus for public use so that a large diversity of services may be used, in such a way that conventionally the vending machines and service rendering machines are independent from one another.

Hence, on the market there is a large variety of automatic vending machines, whose range is wider and wider, in such a way that nowadays it is possible to purchase many products from automatic vending machines. Thus, the range of the popular automatic cigarette and hot and cold beverage vending machines has extended with other vending machines of dry products, sweets, containers of small toys, etc.

Likewise, on the other hand, there is a larger number of machines or apparatus of public utility for the rendering of services, and hence, aside from the telephone service being present in numerous places, lately services such as a connection to Internet, through whose connection a very wide range of services can be obtained, such as listening to music, general information, access to bank data, making purchases, etc., are being included.

In this way, everybody knows that numerous establishments frequently have vending machines and a public telephone, the same being totally independent, with the inconvenience that in some cases in certain establishments in order to make a telephone call one has to request the corresponding connection from the person in charge of the establishment, with the nuisance and loss of time that this represents or else the telephone is at a place at the bar, that is occupied by other people not using the service but preventing the people from using it or bothering them during said use.

In short, it is clear that nowadays the automatic machines or apparatus for the selling of goods or the rendering of services are totally independent, the installation of the corresponding machine or apparatus specific for each one of them being necessary.

DESCRIPTION OF THE INVENTION

The present specification describes a combined system of automatic selling of products and services, being useful for the inclusion thereof in all types of automatic vending machines, the system of the invention comprising the inclusion in an automatic machine of a module that has operating means of one or various services, the machine having the corresponding product selection push buttons and a service selection button, the service module having a display to which when the service option is selected the payment means is designated by the display of the automatic machine, as well as some service operating buttons and some service rendering elements, the service control circuit being controlled by the main control electronics of the automatic machine, the control circuit thereof being connected to the telephone line.

The service control circuit controls the collection operation of the rendered service, in such a way that by means of the main control circuit of the machine, by which it is controlled, the collections are carried out by means of the payment operating system itself of the machine.

The connection to the telephone line permits the connection with an operations center for the transmission of information, so that likewise from said operations center data can be transmitted and the automatic machine can be controlled.

On the other hand, the service module itself can include a service selection and designation of the payment means button from the display of the machine to the display of the service module, the part corresponding to the vending machine being free to normally dispense products.

The automatic machine can operate simultaneously rendering the service included in the module thereof and the dispensing of the requested product, in other words, the machine carries out the functions of rendering a service and dispensing goods without interfering with each other.

DESCRIPTION OF A PREFERRED EMBODIMENT

Figure 1:
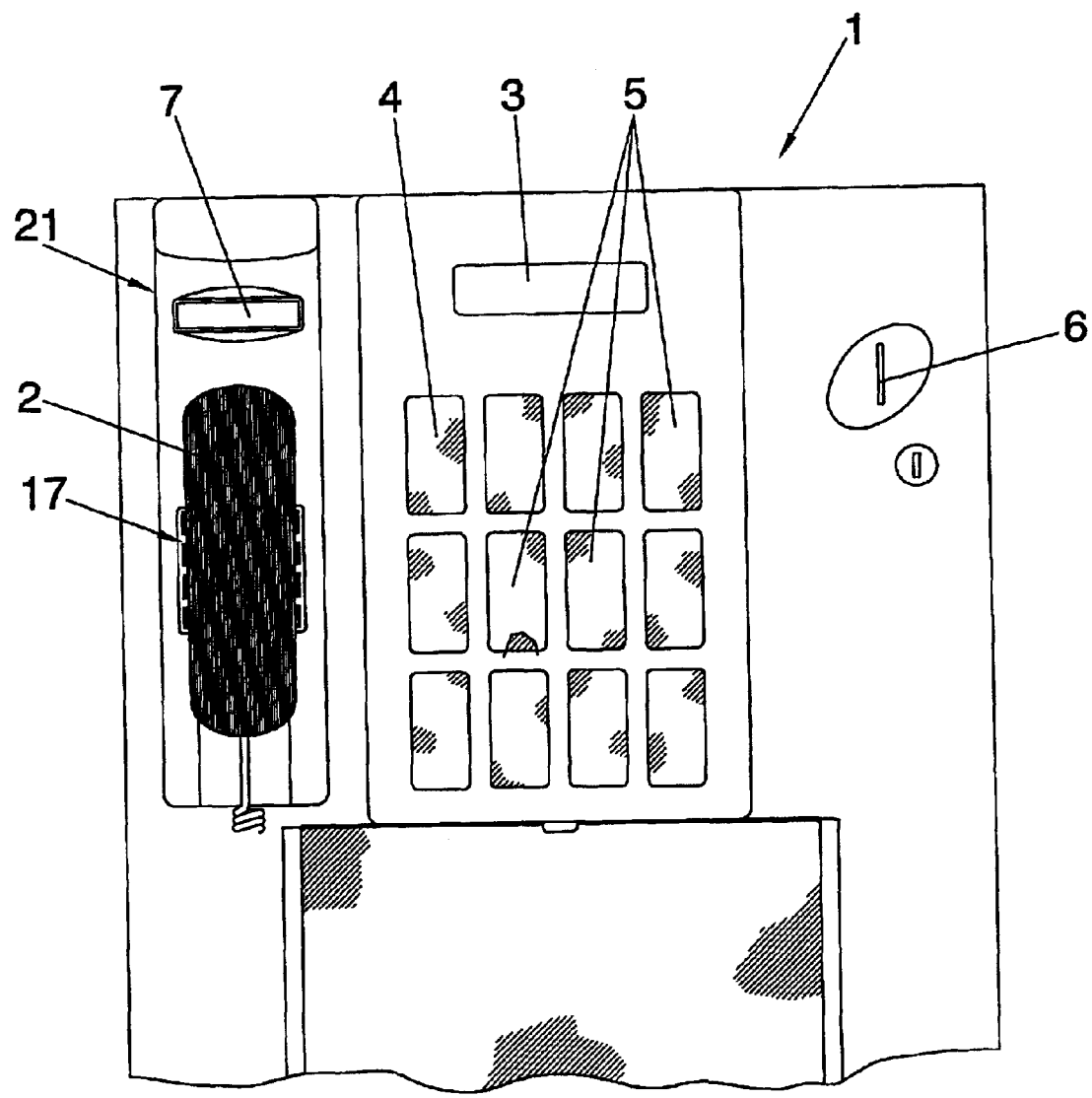
FIG. 1 shows a front detailed view of the top part corresponding to the selection push buttons and other function buttons of a conventional type vending machine, it being possible to see that the same includes a microtelephone, with the corresponding service module, for the service that is rendered.
Figure 2:
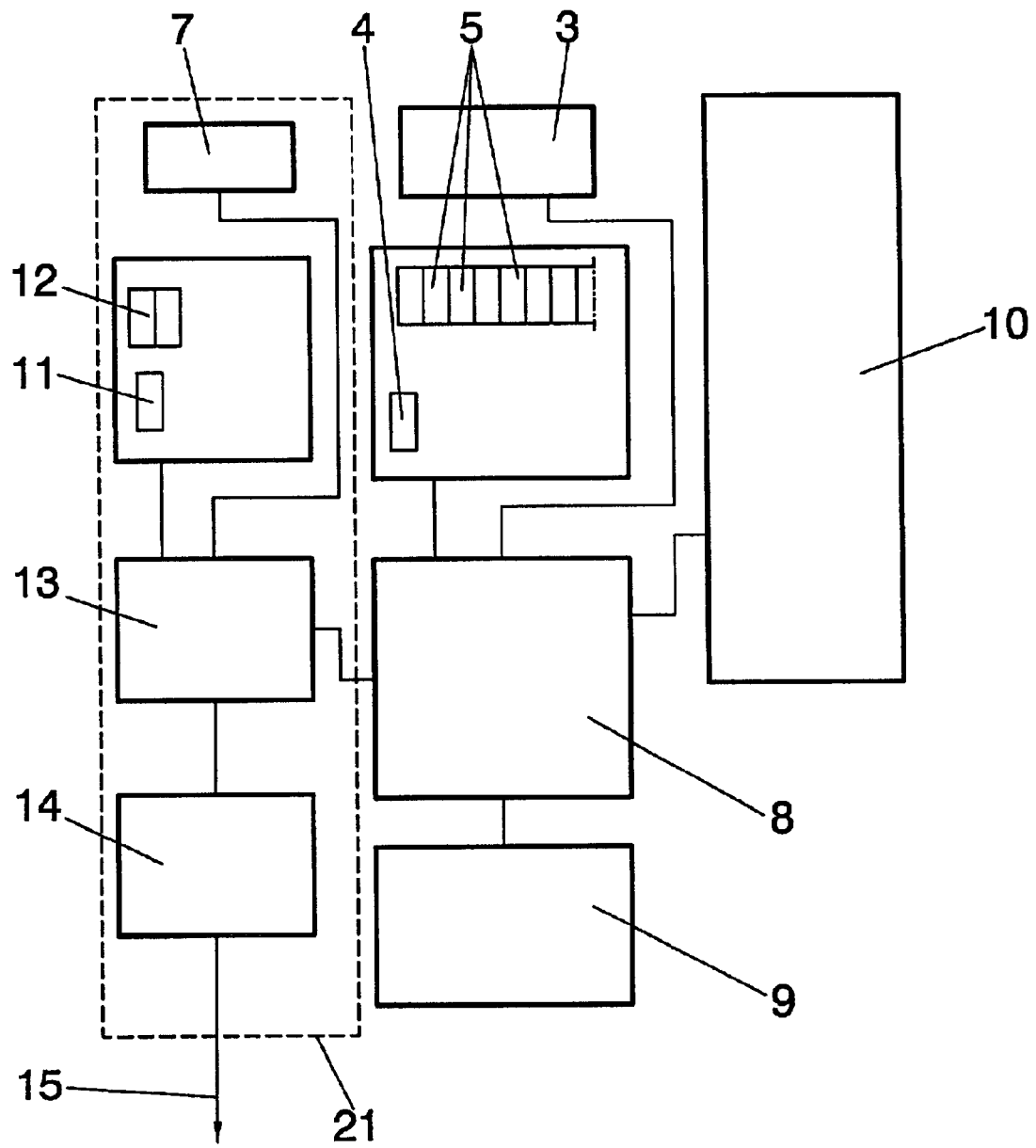
FIG. 2 shows a block diagram corresponding to a combined system of automatic selling of products and services, included in an automatic machine.
Figure 3:
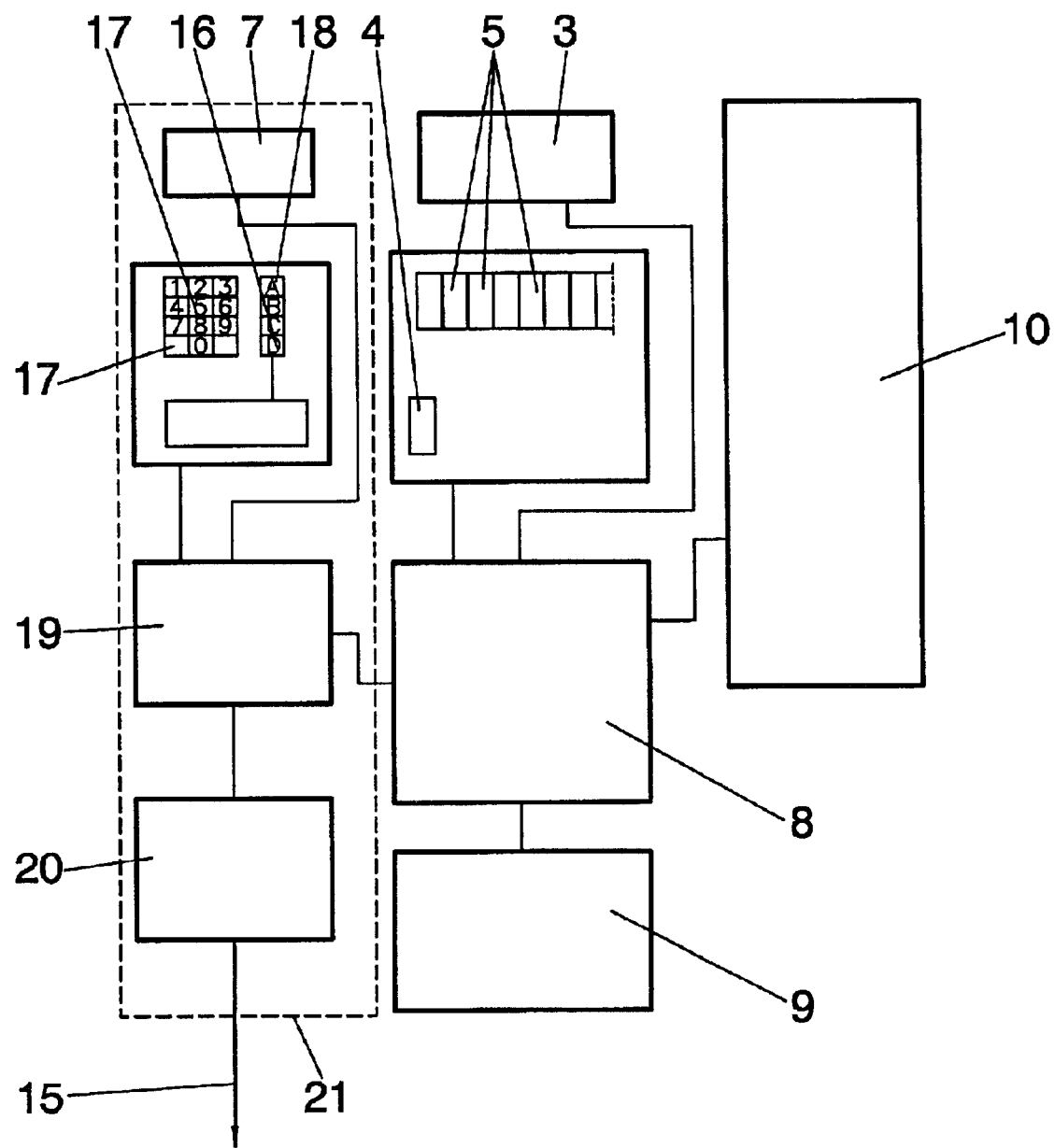
FIG. 3 shows a block diagram corresponding to a practical embodiment of the invention, in which the service that is rendered, by means of the corresponding automatic machine, is the telephone service.

In view of the commented figures and in accordance with the numbering used, we can see how starting with a conventional vending machine (1), the same can include a service to be rendered, being in this case, a telephone service, by means of the inclusion of a telephone module (21) with its corresponding microphone (2), the machine having in its top part some product selection push buttons (5), as well as a push button (4) corresponding to the service selection that the vending machine (1) includes, combining in a single machine the automatic selling of products and the rendering of a service.

Hence, the combined system of automatic selling of products and services is based on the combination in a single machine of the possibility of selling products and rendering a service for the purpose of facilitating the automatic selling of products, such as cigarettes, hot or cold beverages, etc. and the rendering of a service with a variable cost, such as for example, the telephone service, the connection to Internet, etc., The payment operating means, for the selling of products, as well as for rendering the service are shared, and the same are based on the ordinary means that a conventional vending machine has, for which purpose the machine includes the coin slot (6) and a display (3) in order to have different information and where, likewise, the amount introduced appears, if the purchase operation is carried out by inserting coins. If the machine accepts cards, the same will have the corresponding card reader.

The machine includes a second display (7), corresponding to the service that the machine renders, to which the inserted amount will pass when the user selects the service to be rendered thereby.

Furthermore, the machine can operate simultaneously rendering a service and dispensing goods, whereby when the user is using the service that the machine has, a second user can request a product of those that the automatic vending machine dispenses.

The automatic vending machine (1) has the corresponding control circuit (8) by means of which it controls the different elements and systems that it includes, and hence, the product dispensing elements (9), the payment system (10), as well as the product selection push buttons (5) and service selection (4) push buttons and the product display (3) are controlled.

With the inclusion of the corresponding service in the machine (1), the service control circuit (13), which is controlled by the main control circuit (8) of the machine should be included, in such a way that the cited control circuit (13) controls the possible service designation button or push button (11) and the buttons or push buttons (12) for the introduction of the data necessary for the rendering of the service. Likewise, the service system included in the machine (1) can include a button or push button (16) for the selection of the service and the designation of the payment means.

Hence, the designation button or push button can be included in the keyboard itself of the front of the machine (1), or else it may be included in the service installation module (21) in the automatic machine, just as it has been specified.

The service control circuit (13) likewise controls the service display (7) and the service rendering elements (14). It may be connected to the telephone line (15) by means of the existing systems.

Logically, for the correct operation of the service that the automatic machine (1) includes, there will be the auxiliary devices necessary for this purpose, depending on the service to be rendered, and hence, it may have a microtelephone, a loudspeaker, a keyboard, some headphones, a personal computer, screens, etc.

The system will operate in the following manner: when the user wants a product of those that the machine (1) dispenses, the machine will act like a conventional vending machine, that is to say, coins will be inserted or another payment means will be used and the button or push button corresponding to the desired product will be pushed and the machine will dispense the selected product. The collection will be carried out, either making the corresponding return or charging the inserted card.

Likewise, the control system (8) of the machine (1) keeps in the memory the operation carried out for the different controls of the machine, such as for example, the type of product dispensed, the cost thereof, the payment means used, etc., for the subsequent control thereof.

If the user wishes to use the service rendered by the machine (1), the machine will operate in the following manner: once the payment means has been chosen, the button or push button will be actuated in order to use the selected service, the display (7) designating the chosen payment means of the service to be used.

The control electronics establishes the service and determines the cost thereof in terms of the time and the rates existing for this purpose. When the cost is close to the amount inserted or available, the user is notified of this fact by means of the display (7) or other acoustic or light means, so that the user may add more coins and extend the rendering of the service. In this way, the user may insert more money and push the service payment means designation button or push button again, repeating the preceding cycle.

If on the contrary the user wishes to end the rendering of the service the service control system (13) will be informed thereof, by actuating the corresponding device, informing the machine control (8) of a possible return of coins, if appropriate, and the end of the rendering of the service. The machine control (8) will transmit to the payment means operating system (10) this information and the system will return the excess coins or will keep the information corresponding to the total amount of the rendered service in order to charge the same to the payment means used.

A practical embodiment of the invention of particular relevance may be that of a cigarette vending machine (1) and the machine, as the service to be rendered, has a telephone service, in such a way that the machine will have in its front a module (21) with a microtelephone (2), the machine being able to operate as a conventional vending machine and at the same time it may be used to provide telephone service.

For this purpose, the machine (1) includes a display (7) connected to the telephone service, a keyboard (17) for dialing the telephone number to be called, a set of auxiliary buttons (18) in order to complete the telephone function. Optionally, the service module (21) can include a button (16) in order to designate the telephone service, as well as the corresponding telephone service control circuit (19) and the service rendering elements (20), with the respective connection to the telephone line (15).

Hence, when the machine is used like a vending machine it will operate just like a vending machine, while for its operation like a machine that permits the use of the telephone service, the machine can include in relation to the production selection keyboard itself (5) a button or push button (4) that permits the designation of the telephone service to be used.

In this way, the service designation button or push button can be arranged in relation to the product selection keyboard (button or push button (4)), or else it may be in relation to the telephone module (21) (button or push button (16)).

In order for the automatic vending machine (1) to operate as a telephone service server, the machine will be actuated as follows: once the payment means have been introduced the user will push the service designation button (button (4) or (16)), in such a way that the control system itself (8) of the machine designates the amount inserted or the card used for the rendering of the telephone service, if appropriate the amount passing from the product display (3) to the telephone service display (7).

The user can then dial the desired number by means of the keyboard (17) and the telephone control system (19) establishes the telephone call.

The telephone service control electronics (19) determines the cost of the telephone call in terms of the time and rates established for this purpose.

When the cost of the call is close to the amount inserted or available, the user is notified of this fact by means of the display (7) or other means, so that the user may insert more coins and continue on with the call, in which case, the service designation button (4) or (16) will be pushed again so that the amount inserted is designated by the service display (7).

On the other hand, when the user decides to end the telephone call the microphone will be hung up, a fact that will be detected by the telephone service control system (19), which likewise controls the telephone service rendering elements (20).

The telephone service control (19) will notify said fact to the main control (8) of the machine (1), as well as the possible return of coins, an operation that is controlled by the control system itself (10) of the machine.

Likewise, the machine control (8) transmits this information to the payment means operating system (10) and this system will return the money or will keep the information regarding the total amount of the service in order to charge the payment means used.

When a telephone call is made, a second user can use the machine (1) like a conventional vending machine, making the desired purchase of a pack of cigarettes, beverage or any product that the machine dispenses without affecting the service that is being rendered.

Additionally, the connection to the telephone line (15) may be used to transmit reports regarding the operation of the system to an operations center, as well as to receive instructions and operating parameters therefrom.

What is claimed is:

1. A combined system of automatic selling of products and services for automatic vending machines which comprises:

an automatic vending machine comprising:
a first display,
a plurality of product selection push buttons, and;
a main control circuit;
wherein the combined system further comprises:
a service module coupled to the automatic vending machine, the service module comprising:
service operating means,
a second display to which a payment means is assigned from the first display when a service option is selected by means of a service selection push button arranged on a location selected from the automatic vending machine and the service module,
service operating buttons,
service rendering means, and
a service control circuit being controlled by the main control circuit;
the service control circuit being connected to a telephone line for providing an interactive service between a first end of the telephone line which a first user of the service, and a second end of the telephone line which is selected from a second user and a network enabling access to computer files;
the automatic vending machine being enabled to sell products while the service module renders a service, by means of said assignation of the payment means from the first display to the second display, via the service selection pushbutton.

2. A combined system according to claim 1, wherein the service control circuit comprises:
collecting means for carrying out a collection operation of a rendered service;
control means for controlling the collection operation.

3. A combined system according to claim 1, wherein the connection to the telephone line permits connection to an operations center so that information is transmitted and received.

4. A combined system according to claim 3, wherein the automatic vending machine is enabled to simultaneously and independently operate dispensing products while the service included by the service module is being rendered.

5. A combined system according to claim 1, wherein the service module is enabled to include a service selection and designation of the payment means button from the first display to the second display.

6. A combined system according to claim 1, wherein the automatic vending machine is enabled to simultaneously and independently operate dispensing products while the service included by the service module is being rendered.

* * * * *